Patented Apr. 10, 1934

1,954,168

UNITED STATES PATENT OFFICE 1,954,168

SOLDER

Owen W. Ellis, Toronto, Ontario, Canada, assignor to Westinghouse Electric & Manufacturing Company, a corporation of Pennsylvania No Drawing. Application March 26, 1929,
Serial No. 350,139

16 Claims. (Cl. 80—60)

My invention relates to solders and more particularly to ductile strips of solder containing copper and phosphorus.

The principal object of my invention is to provide a solder containing copper and phosphorus in such proportions that the solder may be rolled into ductile strips and sheared without cracking, a sufficient percentage of phosphorus, however, being present to permit fusibility at a temperature below 1000° C. and the formation of a strong joint between the parts to be soldered.

Another object of my invention is to provide ductile strips of a solder containing copper and phosphorus in which the phosphorus is present in a sufficient proportion to impart a strong joint to the parts to be soldered.

A further object of my invention is to provide a process of forming ductile strips of solder containing copper and phosphorus.

At the present time alloys containing phosphorus and copper are well known and a solder containing from 6 to 9% phosphorus is described in Patent No. 1,651,709 which was issued on December 6, 1927, in the name of Jesse L. Jones. The solder described in the above-mentioned patent has certain advantages over solders composed of copper and zinc, such as higher fusibility, which enables the solder to be applied without the use of a flux. Difficulty, however, has been encountered in utilizing such solders because they are so brittle that strips of the material can not be sheared or bent without cracking. Furthermore, it has been found in practice that the brittleness of the solder is imparted to a certain extent to the soldered joint.

I have made the discovery that a solder of this type may be improved and the ductility increased by utilizing a lower percentage of phosphorus in the solder and by subjecting the metal to deformation, as to a rolling operation at an elevated temperature. In practicing my invention the ingredients forming the alloy may be melted together in the usual manner, such as by adding phosphorus to molten copper. I prefer, however, to add the phosphorus to the copper in the form of a phosphor-copper alloy in which the phosphorus is present in the proportion of about 15%, the total amount of phosphorus in the alloy being maintained above 2½% and below 6%.

The alloy after fusion is preferably cast into ingots having a thickness of from ¼ to 1 inch and a length and width corresponding to that of the desired strip. The ingots are then heated to a temperature of from 350 to 600° C. and passed through rollers. This operation is repeated until the thickness of the strip is reduced to approximately .032 of an inch. The alloy is then rolled cold until its thickness is reduced to about .015 to .010 of an inch.

The rolled strips have a fusion point considerably below 1000° C., are capable of being sheared or bent even approximately double without cracking, and when the amount of phosphorus is present in the proportions specified, the solder is capable of producing a sound joint between the surfaces to be brazed.

By utilizing my improved process, alloys of copper and phosphorus containing more than 2½% and less than 6% of phosphorus can be rolled into ductile strips and employed successfully as a solder in place of the copper-zinc or silver solders. When the alloy contains more than 6% of phosphorus it can be utilized as a solder, but it is difficult, if not almost impossible, to produce the solder in the form of ductile strips. I prefer to utilize the phosphorus in proportions varying between 4 and 5% although I do not desire to limit myself to such a specific range, as ductile strips have been formed when the proportion of phosphorus was as high as 5.72%. Ductile strips may also be formed when the amount of phosphorus is below 2½% but for brazing purposes it is desirable that the phosphorus be kept above this amount because one of the purposes of the phosphorus is to reduce the melting point of the solder. The phosphorus also serves as a flux and unless a sufficient amount is present a high temperature is required for the brazing operation and a strong joint will not be formed.

The temperature at which the strips are rolled may also be varied. I prefer, however, to maintain the temperature above 450° C. so as to avoid the possibility of the material cracking in the rolls because a drop in temperature and a consequent loss of ductility. The number of times that the strip is passed through the rolls may also be varied and will depend to a certain extent upon the thickness of the original strip. In rolling strips having a thickness of ¼ of an inch, the strips were repeatedly heated and passed through the rolls from 7 to 12 times during which operation the thickness of the strip was reduced to approximately .040 to .021 of an inch. The material was then rolled cold from this thickness to from .015 to .010 of an inch. The cold rolling step may sometimes be omitted and the material rolled to the desired thickness while maintaining the alloy at an elevated temperature. I have found, however, that the final cold rolling operation produces material having greater ductility.

While I do not desire to limit my invention to any particular number of rolling operations, it is essential in producing a solder having a high degree of ductility to pass the heated material through the rolls a fairly large number of times. The particular physical change produced in the material by the rolling operation is not definitely understood. I am of the opinion, however, that the rolling operation breaks up the copper—copper phosphide eutectic which causes an increase in the ductility of the alloy.

The solder melts at a lower temperature than the copper-zinc solders or silver solders, and is sufficiently fluid at the melting temperature to flow between the surfaces to be soldered. The heat, however, reduces the amount of phosphorus which raises the melting point of the solder. The joint should therefore be held at the brazing temperature until the alloy becomes viscous. A somewhat higher temperature than necessary materially reduces the time required.

My improved solder may be applied for the formation of joints without the use of a flux when brazing copper to copper, brass to copper or bronze to copper. In brazing other copper alloys, such as Monel metal or copper-silicon alloys, the surface of the joint should be cleaned with emery cloth and covered with a flux, such as microcosmic salt or borax.

The solder has a melting range of 700 to 900° C. and may be utilized in numerous applications, such as for brazing rotor bars to end rings, or for forming joints on rolled brass rings or switch studs.

My solder is more ductile and less expensive than the copper phosphorus solder described in the patent to Jones and has greater fusibility than the high melting silver or copper-zinc solders and has only slightly greater electrical resistance. It produces a stronger joint and is capable of resisting vibrations for longer time than either of the solders mentioned.

While I have described my invention in considerable detail, it will be understood that various modifications may be made therein without departing from the spirit of my invention. I desire, therefore, that only such limitations shall be imposed thereon as are required by the prior art and the appended claims.

I claim as my invention:

1. A brazing solder comprising an alloy of more than 2½% and less than 5% phosphorus and the remainder copper said solder being sufficiently ductile to permit shearing strips thereof without substantial cracking.

2. A ductile strip, capable of being sheared, of an alloy other than zinc brass comprising copper and phosphorus, the phosphorus being present in an amount greater than 2½% and less than 6% the balance being mainly copper.

3. A ductile strip, capable of being sheared, of solder comprising an alloy other than zinc brass of copper and phosphorus, the phosphorus being present in an amount ranging from 4 to 5% the balance being mainly copper.

4. The process of forming ductile strips of solder which comprises repeatedly rolling an alloy comprising of a major proportion of copper and phosphorus in amounts ranging up to 6% while maintaining the alloy at a temperature of at least 350° C.

5. The process of forming ductile strips of solder containing copper and phosphorus which comprises preparing an alloy containing the copper and more than 2½ and less than 6% of phosphorus, and repeatedly rolling the alloy while maintaining it at a temperature between 350 and 650° C.

6. The process of forming ductile strips of solder containing copper and phosphorus which comprises preparing an alloy containing copper and between 4 and 5% phosphorus and repeatedly rolling the alloy while maintaining it at a temperature between 450 and 650° C.

7. The process of forming ductile strips of solder containing copper and between 2½ and 6% of phosphorus which comprises repeatedly rolling an ingot of the alloy while maintaining it at a temperature of between 350 and 650° C. until the thickness of the ingot is reduced to from .040 to .021 of an inch and then continuing rolling at normal temperature until the thickness is reduced to from .015 to .010 of an inch.

8. A brazing solder comprising a ductile strip capable of being sheared of an alloy containing phosphorus in amounts ranging up to 6%, the balance being mainly copper said solder having a melting point below 1000° C.

9. A ductile elongate piece of welding metal capable of being sheared without substantial cracking of an alloy comprising a copper base other than zinc brass and over 2.5% phosphorus, the alloy having a melting point below 1000° C.

10. The process of forming a ductile alloy containing phosphorus and copper which comprises preparing an alloy comprising a major proportion of copper and from 2½% to 5% phosphorus and rolling the alloy at a temperature of at least 350° C.

11. As an article of manufacture, a welding alloy of mainly copper and at least 2.5% phosphorus base other than zinc brass that is sufficiently ductile to be sheared in strip form without cracking materially.

12. An article of manufacture adapted for use in brazing and comprising an alloy of mainly copper and at least 2.5% phosphorus base other than zinc brass in the form of an elongate piece of welding metal that is sufficiently ductile to be sheared without cracking materially.

13. As an article of manufacture, a welding alloy of mainly copper and at least 2.5% phosphorus base other than zinc brass in the form of ductile strips elongate pieces of welding metal having sufficient metal deformation to be sheared without cracking materially.

14. As an article of manufacture, a welding alloy of mainly copper and at least 2.5% phosphorus base other than zinc brass in the form of rolled pieces of welding metal of approximately 0.015 inch thickness that are sufficiently ductile to be sheared without cracking materially.

15. As an article of manufacture a ductile elongate piece of welding metal formed of an alloy substantially of copper containing from about 2½% to 6% phosphorus, the piece of metal being sufficiently ductile to be sheared in rolled strips about 0.015 inch thick without substantial cracking, and suitable for use in welding and soldering.

16. As an article of manufacture a ductile elongate piece of welding metal formed of an alloy substantially of copper containing from about 2½% to 6%, phosphorus, the piece of metal being sufficiently ductile to be sheared in rolled strips about 0.015 inch thick without substantial cracking and suitable for use in welding and soldering, the article having a melting point below about 1000° C.

OWEN W. ELLIS.